United States Patent
Korenjak et al.

(10) Patent No.: US 7,235,035 B2
(45) Date of Patent: Jun. 26, 2007

(54) RELEASE CLUTCH FOR A VEHICLE

(75) Inventors: Norbert Korenjak, Stadl-Paura (AT); Heinz Kusel, Pennewang (AT)

(73) Assignee: BRP-Rotax GmbH & Co. KG, Gunskirchen (AU)

( * ) Notice: Subject to any disclaimer, the term of this patent is extended or adjusted under 35 U.S.C. 154(b) by 79 days.

(21) Appl. No.: 10/833,135

(22) Filed: Apr. 28, 2004

(65) Prior Publication Data

US 2004/0214685 A1  Oct. 28, 2004

Related U.S. Application Data

(60) Provisional application No. 60/465,779, filed on Apr. 28, 2003.

(51) Int. Cl.
*B60W 10/02* (2006.01)
(52) U.S. Cl. ............... 477/174; 477/44; 477/166; 477/906; 192/48.3; 474/8; 474/13; 474/14
(58) Field of Classification Search .............. 477/44, 477/166, 174, 906; 192/48.3, 48.5; 474/8, 474/13, 14
See application file for complete search history.

(56) References Cited

U.S. PATENT DOCUMENTS

| | | | |
|---|---|---|---|
| 2,639,014 A | | 5/1953 | Munschauer |
| 4,433,594 A | | 2/1984 | Smirl |
| 4,436,193 A | * | 3/1984 | Smirl .............. 192/107 C |
| 4,817,471 A | * | 4/1989 | Tury .............. 477/125 |
| 5,050,715 A | * | 9/1991 | Itoh et al. .............. 192/3.3 |
| 5,310,384 A | * | 5/1994 | Siemon .............. 474/70 |
| 5,725,446 A | * | 3/1998 | Kaku et al. .............. 474/13 |
| 5,827,148 A | * | 10/1998 | Seto et al. .............. 477/15 |
| 5,853,058 A | * | 12/1998 | Endo et al. .............. 180/65.1 |
| 6,338,694 B1 | * | 1/2002 | Eguchi .............. 477/39 |
| 6,609,600 B1 | * | 8/2003 | Shen .............. 192/48.5 |
| 2002/0026928 A1 | | 3/2002 | Holxi | |

FOREIGN PATENT DOCUMENTS

| | | |
|---|---|---|
| DE | 4241594 | 4/1994 |
| EP | 1191260 | 3/2002 |
| EP | 834680 | 9/2002 |
| GB | 2096719 | 10/1982 |
| JP | 60222646 | 11/1985 |

OTHER PUBLICATIONS

European Search Report dated Jul. 22, 2004 of EP Patent Application 04010133.9.

* cited by examiner

*Primary Examiner*—David D. Le
(74) *Attorney, Agent, or Firm*—Osler, Hoskin & Harcourt LLP

(57) ABSTRACT

A vehicle includes an engine that powers a wheel through a drive train. The drive train includes a continuously variable transmission (CVT) and toothed gearing disposed between the CVT and the wheel. A release clutch is also disposed between the CVT and the wheel. A controller controls the release clutch so as to disengage the clutch when the engine is not running and engage the clutch when the engine is running. The controller includes a hydraulic cylinder that fluidly connects to the engine's oil system so that engine-generated oil pressure engages the release clutch. Disengagement of the release clutch makes it easier to push the vehicle when the engine is not running, for example, when the engine breaks down.

20 Claims, 3 Drawing Sheets

RELEASE CLUTCH FOR A VEHICLE

CROSS REFERENCE TO RELATED APPLICATIONS

This invention relates to and claims the benefit of priority from U.S. Provisional Application No. 60/465,779, filed Apr. 28, 2003, which is hereby incorporated by reference herein in its entirety.

BACKGROUND OF THE INVENTION

1. Field of the Invention

This invention relates to drive trains for vehicles, and specifically relates to clutch mechanisms for vehicles that utilize continuously variable transmissions.

2. Description of Related Art

Various recreational vehicles (e.g., motorcycles, scooters, go-karts, all-terrain vehicles (ATVs), snowmobiles, etc.) have drive trains that include continuously variable transmissions (CVTs) to transfer power from a propulsion unit (e.g., an internal combustion engine, electric motor, etc.) to a propelled device (e.g., a wheel(s), an endless track, etc.) to propel the vehicle. Such drive trains also typically include toothed gearing (e.g., additional reduction gears and/or a manually operated transmission) between the CVT and the propelled device.

In such drive trains, there is typically a constant driving connection between the propelled device of the vehicle, the gearbox, and the CVT, as well as possibly the engine. If the vehicle has to be pushed (e.g., if the engine is inoperable), rotation of the propelled device drives the belt of the CVT and the gears of the gearbox. The resistance of the gearbox and CVT to such rotation impairs the propelled device's ability to freely move, which makes it very difficult or even impossible to move the vehicle in difficult terrain, particularly if the vehicle itself is heavy.

In some vehicles, a centrifugal clutch is placed downstream on the drive train from the CVT (i.e., between the CVT and the propelled device). Consequently, the propelled device does not drive the CVT when the vehicle is being pushed. Unfortunately, such downstream centrifugal clutches are particularly difficult to design, manufacture, and install because they must operate at the low speeds and high torques that are present downstream from the CVT. Consequently, the centrifugal clutch must use very heavy flyweights and an extremely rigid structure. The clutch must be very strong to endure the high torque that is present at both low and high speeds. The extreme operating conditions that the centrifugal clutch must endure produce fatigue and wear on the clutch, so that it is impossible to ensure long life and reliability. Finally, the addition of such a centrifugal clutch complicates assembly of the vehicle and makes the vehicle more expensive.

SUMMARY OF THE INVENTION

Accordingly, one aspect of one or more embodiments of this invention provides a vehicle with a simple, inexpensive, reliable, wear-resistant release clutch that makes it easier to push vehicle when the vehicle's engine is not running.

Another aspect of one or more embodiments of this invention provides a vehicle that includes a propulsion unit, a propelled device, and a continuously variably transmission operatively connecting the propulsion unit to the propelled device. The vehicle also includes a release clutch disposed between the continuously variable transmission and the propelled device. The release clutch has an engaged position and a disengaged position. The release clutch transfers power from the continuously variable transmission to the propelled device when in the engaged position, and prevents the transfer of power from the continuously variable transmission to the propelled device when in the disengaged position. The vehicle also includes a non-centrifugally operated controller. The controller includes an actuator that operates the release clutch. The controller automatically disengages the release clutch when the propulsion unit is not operating.

According to a further aspect of one or more of these embodiments, the actuator is one of an electromagnetic actuator, a hydraulic actuator, and a pneumatic actuator. The controller may also include an electronic control unit that controls the actuator.

According to a further aspect of one or more of these embodiments, the vehicle includes a centrifugal clutch operatively disposed between the propulsion unit and the propelled device. The centrifugal clutch may be disposed between the propulsion unit and the continuously variable transmission.

According to a further aspect of one or more of these embodiments, the controller automatically engages the release clutch when the propulsion unit is operating.

According to a further aspect of one or more of these embodiments, the vehicle also includes an input shaft operatively connected to the continuously variable transmission, and a drive shaft operatively connected to the propelled device. The release clutch operatively connects between the input shaft and the drive shaft.

According to a further aspect of one or more of these embodiments, the release clutch is biased towards its disengaged position.

According to a further aspect of one or more of these embodiments, the propulsion unit includes an oil system. The actuator includes a hydraulic piston and cylinder that operate the release clutch. The controller comprises a fluid connection between the hydraulic cylinder and the oil system such that when the propulsion unit is running, oil pressure in the oil system controls the hydraulic piston and cylinder, which engages the release clutch.

According to a further aspect of one or more of these embodiments, the vehicle includes an alternator that electrically connects to the actuator.

According to a further aspect of one or more of these embodiments, the vehicle also includes a manual override switch operatively connected to the controller. The manual override switch allows a rider to selectively engage the release clutch when the propulsion unit is not operating. Alternatively and/or additionally, the manual override switch may allow a rider to selectively disengage the release clutch when the propulsion unit is operating.

Another aspect of one or more embodiments of the present invention provides a vehicle with a release clutch disposed in a drive train between a CVT and a propelled device. The release clutch disengages the CVT from the propelled device when a propulsion unit is not operating. Accordingly, a downstream centrifugal clutch is not required to disengage the CVT form the propelled device. A smaller centrifugal clutch may instead be placed upstream of the CVT between the CVT and the propulsion unit. Such an upstream centrifugal clutch operates at higher speeds and lower torques than conventional downstream centrifugal clutches. Accordingly, the upstream centrifugal clutch can be smaller, less expensive, more wear-resistant, and easier to construct than conventional downstream centrifugal clutches.

Another aspect of one or more embodiments of the present invention provides a vehicle including a propulsion unit, a propelled device, and a continuously variable transmission operatively connecting the propulsion unit to the propelled device. A release clutch is disposed between the continuously variable transmission and the propelled device. The release clutch has an engaged position and a disengaged position. The release clutch transfers power from the continuously variable transmission to the propelled device when in the engaged position. The release clutch prevents the transfer of power from the continuously variable transmission to the propelled device when in the disengaged position. A controller operatively controls the release clutch. The controller automatically disengages the release clutch when the propulsion unit is not operating and automatically engages the release clutch when the propulsion unit is operating.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which from a part of this original disclosure.

DETAILED DESCRIPTION

Figure 1:
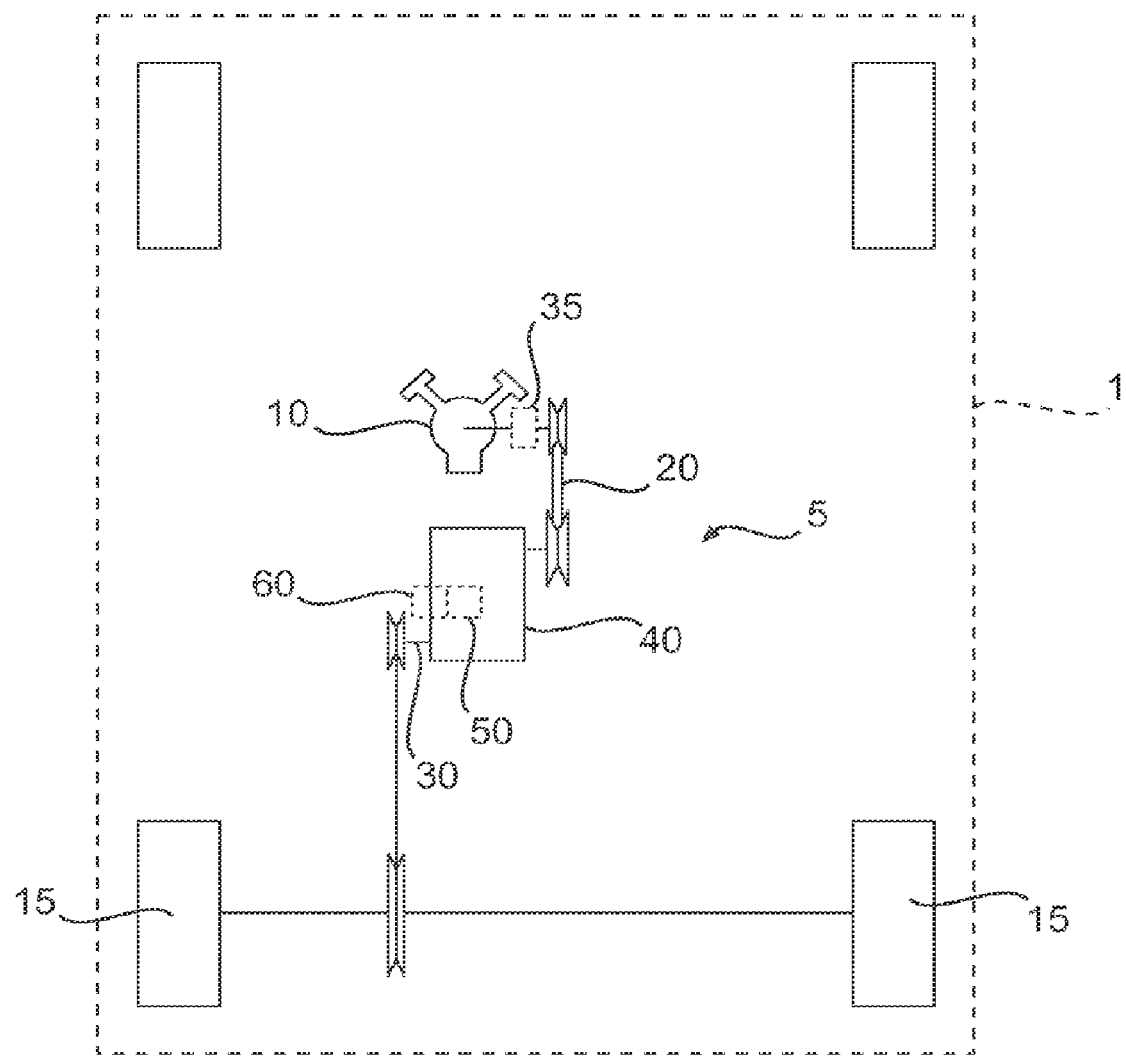
FIG. 1 is a diagrammatic top view of a vehicle according to an embodiment of the present invention.
Figure 2:
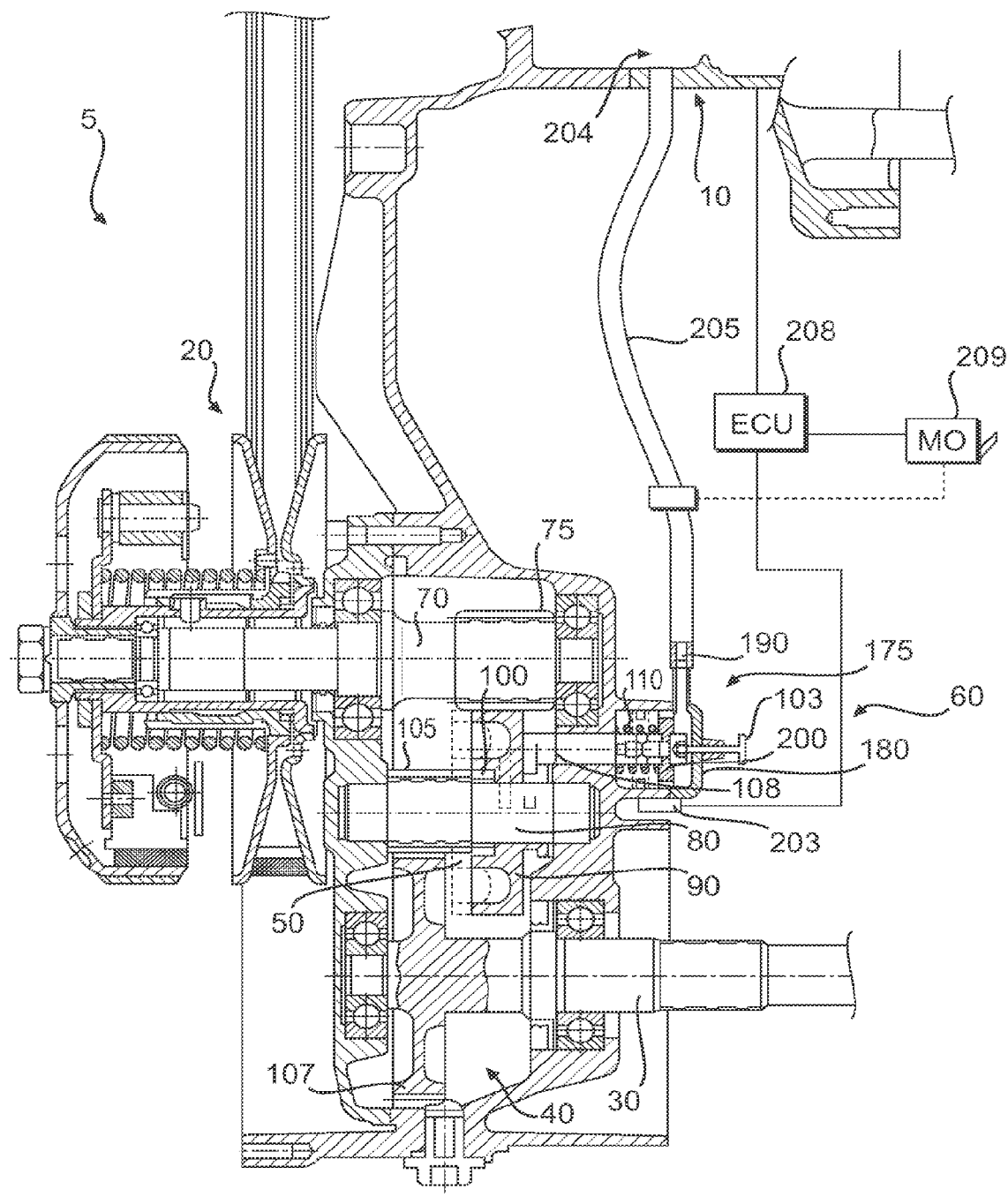
FIG. 2 is a partial bottom cross sectional plan view of a drive train for the vehicle illustrated in FIG. 1, containing a release clutch in accordance with an embodiment of the present invention.

As shown in FIG. 1, a vehicle 1, which may be any one of a motorcycle, a scooter, a go-kart, an ATV or a snowmobile, includes, among other conventional elements, a drive train 5 that operatively connects a propulsion unit 10 (e.g., an internal combustion engine, motor, etc.) to a propelled device 15 (e.g., wheel(s), an endless track, etc.). As shown in FIGS. 1 and 2, the drive train 5 includes a continuously variable transmission (CVT) 20 operatively disposed between the propulsion unit 10 and a drive shaft 30 for the propelled device 15. A centrifugal clutch 35 is operatively disposed between the propulsion unit 10 and the CVT 20. Toothed gearing 40 is operatively disposed between the CVT 20 and the drive shaft 30. The drive shaft 30 operatively connects to the propelled device 15 to transfer torque from the toothed gearing 40 to the propelled device 15.

As shown in FIG. 2, the toothed gearing 40 includes a drive shaft 70 that operatively connects to an output end of the CVT 20. A pinion gear 75 mounts to or is integrally formed with the drive shaft 70. A gear 90 mounts to a lay shaft 80. The gear 90 is axially movable on the lay shaft 80 between a disengaged position (shown in solid lines in FIG. 2) and an engaged position (shown in dotted lines in FIG. 2). The gear 90 engages the pinion gear 75 in both its engaged and disengaged positions.

Internal teeth (or shift dogs, splines, keys, other surface features, etc.) 100 are disposed on the gear 90. The teeth 100 are shaped to mate with teeth or other surface features of a gear 105 that is mounted to the lay shaft 80. The gear 105 may rigidly mount to the lay shaft 80 such that the gear 105 and shaft 80 rotate together. Alternatively, the gear 105 may mount to the shaft 80 to allow free relative rotation. The teeth 100 do not engage the gear 105 when the gear 90 is in its disengaged position such that the gears 90, 105 may rotate relative to each other. Conversely, the teeth 100 engage the gear 105 when the gear 90 is in its engaged position such that the gears 90, 105 rotate in unison. The gears 90, 105 therefore define a release clutch 50 such that the engaged and disengaged positions of the gear 90 define engaged and disengaged positions of the release clutch 50.

A gear 107 rigidly mounts to the drive shaft 30 and engages the gear 105. The illustrated toothed gearing 40 functions as a reduction transmission. Other toothed gearings according to the present invention may alternatively and/or additionally include a manual transmission that allows a rider to selectively choose between at least two gears including one or more forward gears and one or more reverse gears.

As shown in FIG. 2, the release clutch 50 is operatively disposed in the toothed gearing 40 between the CVT 20 and the propelled device 15. Incorporation of the release clutch 50 into the toothed gearing 40 eliminates the need for a separate clutch housing or separate clutch components, which makes the release clutch 50 less expensive, simpler, and more reliable. Alternatively, the release clutch 50 may be disposed upstream or downstream from the toothed gearing 40 without deviating from the scope of the present invention. The release clutch 50 allows the CVT 20, the propulsion unit 10, and part of the toothed gearing 40 to be selectively engaged and disengaged from the propelled device 15.

As shown in FIG. 2, a controller 60 controls the operation of the clutch 50. The controller 60 disengages the clutch 50 and gear 90 when the propulsion unit 10 is not running, and engages the clutch 50 when the propulsion unit 10 is operating. Consequently, when the propulsion unit 10 is not operating (due to, e.g., mechanical failure, the operator's intentional stopping of the propulsion unit 10, etc.), the vehicle 10 may be pushed without turning the CVT 20, engine 10, and part of the toothed gearing 40, which advantageously reduces the force required to push the vehicle 1. Consequently, only the rolling/moving resistance of the propelled device 15 must be overcome.

The controller 60 includes a selector fork 108 (or other selector linkage) that engages the gear 90 to control the gear's axial position on the shaft 80. The controller 60 also includes a clutch actuator 175. The clutch actuator 175 comprises a hydraulic cylinder 180 and piston 200. The piston 200 mounts to the selector fork 108 to control the axial position of the selector fork 108 and gear 90. An oil pressure connection 190 fluidly connects to the cylinder 180. The oil pressure connection 190 fluidly connects to an oil system 204 of the propulsion unit 10 via a suitable tube or passageway 205. A spring (or other resilient member) 110 extends between the piston 200 and cylinder 180 to bias the piston 200, selector fork 108, and gear wheel 90 toward the right as shown in FIG. 2 so as to bias the gear 90 and clutch 50 so that they are disengaged. A hydraulic connection (not shown) may be used to replace the spring 110 and bias the piston 200 toward the disengaged position shown in FIG. 2.

Hereinafter, the operation of the controller 60 is described with reference to FIG. 2. When the propulsion unit 10 is turned on, its oil system 204 generates oil pressure that passes through the passageway 205 into the cylinder 200. The oil pressure overcomes the force of the spring 110 and pushes the piston 200, selector fork 108, and gear 90 to the left, which engages the gear 90 and clutch 50. With the clutch 50 engaged, the propulsion unit 10 can transfer power and torque to the propelled device 15 via the CVT 20 and toothed gearing 40.

When the propulsion unit 10 is turned off, the oil pressure in the propulsion unit's oil system 204 dissipates, which causes the force of the spring 110 to overcome the oil pressure in the cylinder 200. The spring 110 therefore forces the piston 180, selector fork 108, and gear 90 toward the right, which disengages the gear 90 and clutch 50. Consequently, when the propulsion unit 10 is not running, the vehicle 1 may be pushed without having to rotate the CVT 20 and engine 10.

The controller 60 also includes a manual override switch 103 that enables a rider to selectively engage the release clutch 50 even when the propulsion unit 10 is not operating. The override switch 103 allows the rider to physically push the piston 200, selector fork 108, and gear 90 into the engaged position even when the propulsion unit 10 is not providing oil pressure to the cylinder 180. The rider can use the manual override switch 103 to selectively increase a rolling resistance of the vehicle 1, thereby braking the vehicle 1. The illustrated override switch 103 includes a threaded rod that sealingly engages cylinder 200 to allow a user to rotate the knob and push the piston to the left as shown in FIG. 2 to engage the release clutch 50.

The override switch 103 may alternatively rely on any other conventional device. For example, an override switch according to another embodiment of the present invention may fluidly connect to the tube 205 to artificially induce an oil pressure in the cylinder 200 to engage the clutch 50. An override switch may be used as well to have the release clutch disengaged while the propulsion unit 10 is operating. This can be advantageous for maintaining the vehicle 1, preferably the propulsion unit 10 itself. Both types of override switches can be designed as mechanical devices (e.g., a knob, a locking device, etc.) or electromechanical devices (e.g., switch, ECU, etc.).

The controller 60 preferably has a fast response time so that the release clutch 50 engages soon after the propulsion unit 10 begins to run. Consequently, the clutch 50 engages before the engine 10 transmits significant torque through the CVT 20 to the release clutch 50. The release clutch 50 therefore engages when there is little or no torque transmitted through the clutch 50. This quick engagement minimizes any wear that results from repeated operation of the clutch 50 during normal use.

As shown in FIG. 2, a sensor 203 senses a position of the piston 200 to determine whether the release clutch 50 is engaged or disengaged. Alternatively, the sensor 203 may directly monitor the position of the gear 90 or selector fork 108. The sensor 203 may monitor the engagement position of the release clutch 50 by monitoring a relative speed of the propulsion unit 10 and drive shaft 30. Alternatively, the sensor 203 may monitor the release clutch 50 by monitoring an oil pressure in the cylinder 200. Alternatively, the sensor 203 may monitor a generator-current generated by the propulsion unit 10. The sensor 203 may alternatively utilize any other type of known device to determine whether the release clutch 50 is engaged or disengaged.

The sensor 203 operatively connects to an electronic control unit (ECU) 208. The ECU 208 operatively connects to the propulsion unit 10. The ECU 208 receives signals from the sensor 203 and limits a speed of the propulsion unit 10 when the release clutch 50 is disengaged. Consequently, the sensor 203 and ECU 208 prevent the propulsion unit 10 from overspeeding and damaging itself if the clutch 50 fails to engage and the propulsion unit 10 accelerates without resistance. Similarly, limiting the propulsion unit 10 speed when the clutch 50 is disengaged also limits the wear that the clutch 50 experiences when it engages while the propulsion unit 10 is transmitting power and torque through the drive trains. The overspeed limiting feature is particularly advantageous when the controller 60 has a slow response time such that the propulsion unit 10 would begins to operate and would otherwise accelerate before the controller 60 engages the clutch 50.

Figure 3:
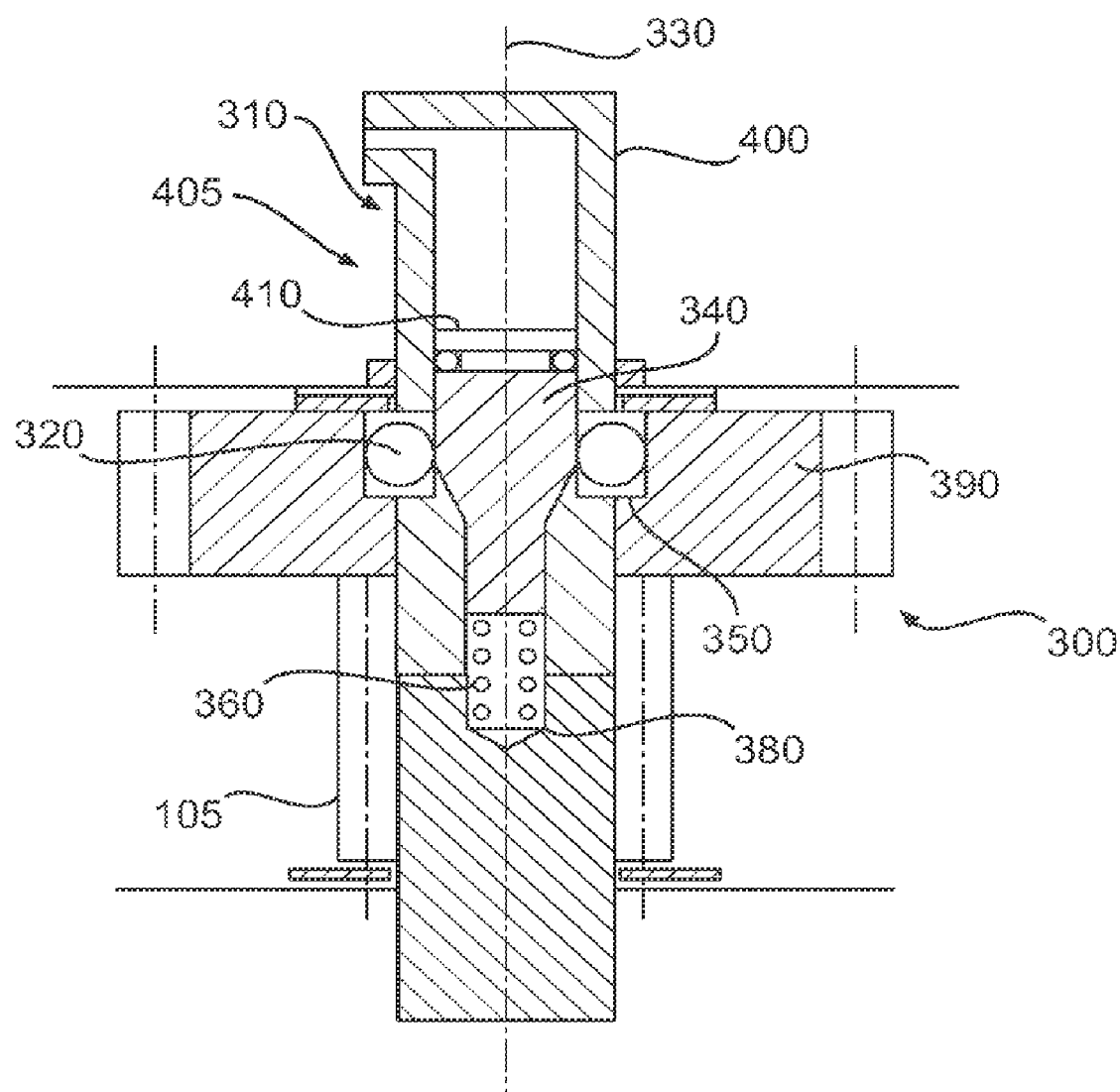
FIG. 3 is partial cross-sectional view of a release clutch for a vehicle according to another embodiment of the present invention.

FIG. 3 illustrates another embodiment of a release clutch 300 and controller 310 according to the present invention. The release clutch 300 and controller 310 may replace the release clutch 50 and controller 60 of the above-described embodiment without deviating from the scope of the present invention.

As shown in FIG. 3, the release clutch 300 comprises a lay shaft 380 and gear 390 that are selectively engageable. The lay shaft 380 and gear 390 may replace the lay shaft 80 and gear 90 of the above-described embodiment. The gear 390 constantly engages the pinion gear 75 illustrated in FIG. 2. The gear 105 is rigidly connected to the lay shaft 380. The gear 390 is freely rotatable on the lay shaft 380. The clutch 300 further comprises locking bodies 320 that can be displaced radially in the lay shaft 380 but rotate with the lay shaft 380. The locking bodies 320 function in conjunction with a cone 340 that can be displaced along the axis 330 of the lay shaft 380. Axial movement of the cone 340 moves the locking bodies 320 radially inward and outward. When the locking bodies 320 are outwardly disposed (due to the cone 340 being moved downwardly as shown in FIG. 3), the locking bodies 320 engage recesses 350 in the gear 390 so that the gear 390 engages the lay shaft 380, thereby engaging the clutch 300. Conversely, when the locking bodies 320 are inwardly disposed (due to the cone 340 being moved upwardly as shown in FIG. 3), the locking bodies 320 do not engage the recesses 350 in the gear 390, the gear 390 disengages the lay shaft 380, and the clutch 300 disengages. While the illustrated embodiment utilizes discrete locking bodies 320, an expandable locking ring with radial protrusions, or any other suitable locking body, may replace the locking bodies 320 without deviating from the scope of the present invention.

The controller 310 controls the operation or engagement of the locking bodies 320 with the gear 390. As shown in FIG. 3, the controller 310 comprises a clutch actuator 405. The clutch actuator comprises a cylinder 400 and a piston 410. The piston 410 mounts to or is integrally formed with the cone 340 such that movement of the piston 410 engages and disengages the clutch 300. A spring 360 extends between the lay shaft 380 and the cone 340 to bias the cone 340 upwardly and disengage the clutch 300. The cylinder 400 is fluidly connected to the oil system 204 of the propulsion unit 10 such that the controller 310 operates in the same manner as the above-described controller 60 to move the piston 410 and release clutch 300 between engaged and disengaged positions.

While the illustrated release clutches rely on selectively engageable teeth or other surface features (e.g., clutch 50) or locking bodies that engage adjacent elements of the drive train (e.g., clutch 300), any other suitable clutch mechanism (e.g., friction clutches, jaw clutches, multidisk clutches, multiplate clutches, etc.) may alternatively be used without deviating from the scope of the present invention.

While the illustrated controllers 60, 310 utilize hydraulic actuators 175, 405 that operate the release clutches 50, 300, controllers and actuators according to other embodiments of the present invention may use any other type of known actuators and control methods to control the clutch. For example, an electric actuator may control the position of the selector fork 108 in FIG. 2 or the cone 340 in FIG. 3 without deviating from the scope of the present invention. The electric actuator may be powered by an alternator for the propulsion unit so that the electric actuator disengages the clutch when the propulsion unit is running and powering the alternator. The electric actuator may be spring loaded so that it disengages the clutch when the alternator stops powering the electric actuator. The electric actuator may comprise any suitable electric actuator such as a solenoid, an electric motor, an electromagnetic actuator, a linear electric actuator, etc. The electric actuator may alternatively be controlled by an electronic control unit and a separate battery such that the electronic control unit controls the electric actuator to disengage the release clutch when the propulsion unit 10 is not operating. With such an arrangement, the hydraulic assembly may be replaced with an electronic solenoid that controls the operation of the clutch. The controller 60 illustrated in FIG. 1 may therefore alternatively comprise an electric actuator, an ECU, and/or an alternator of the propulsion unit, for example.

The controllers 60, 310 are non-centrifugal (i.e., do not operate in direct mechanical response to the motion of centrifugal counterweight(s) that move based on a speed of a shaft directly adjacent to the clutch). Instead, the controllers 60, 310 preferably control the clutches 50, 300 based on an operational state of the propulsion unit 10.

Incorporation of the release clutch 50, 300 into the drive train of an ATV or scooter eliminates the need for a conventional large centrifugal clutch disposed between the CVT 20 and the propelled device 15 because such a centrifugal clutch is no longer needed to disengage the CVT from the propelled device 15. Instead, a smaller, less expensive centrifugal clutch may optionally be disposed between the propulsion unit 10 and the CVT.

One aspect of the present invention that should be apparent from the foregoing discussion is the fact that the release clutch 50, 300 engages automatically when the propulsion unit 10 operates and disengages automatically when the propulsion unit 10 is deactivated (either intentionally or unintentionally). As a result, the clutch 50, 300 offers the advantage, inter alia, of a simplified operation from the operator's perspective. Specifically, the operator need not select a "neutral" transmission setting as is the case in prior art vehicles. Another aspect of the clutch 50, 300 that is advantageous is the fact that the clutch 50, 300 is compact in size and light in weight. Moreover, due to it simple construction, the clutch 50, 300 will be less prone to mechanical failure than prior art transmissions.

It is also contemplated that the invention may include a manual override (MO) switch 209. The manual override switch 209 may connect to the ECU 208. Alternatively (or in addition), the manual override switch 209 may connect to the tube 205. Other arrangements are also possible, as would be appreciated by those skilled in the art. The manual override switch 209 functions to disengage the clutch 50, 300 even when the propulsion unit 10 operates. This provides the same functionality as the manual override switch 103. With a manual override switch 103, 209, the vehicle 1 may be serviced or maintained, among other reasons.

The foregoing description is included to illustrate the operation of the preferred embodiments and is not meant to limit the scope of the invention. To the contrary, those skilled in the art should appreciate that varieties may be constructed and employed without departing from the scope of the invention, aspects of which are recited by the claims appended hereto.

What is claimed is:

1. A vehicle, comprising:
   a propulsion unit;
   a propelled device;
   a continuously variably transmission operatively connecting the propulsion unit to the propelled device;
   a release clutch disposed between the continuously variable transmission and the propelled device, the release clutch having an engaged position and a disengaged position, wherein the release clutch transfers power from the continuously variable transmission to the propelled device when in the engaged position, and wherein the release clutch does not transfer power from the continuously variable transmission to the propelled device when in the disengaged position;
   a non-centrifugally operated controller, the controller comprising an actuator that operates the release clutch; and
   a manual override switch operatively connected to the controller, the manual override switch allowing a rider to selectively change the position of the release clutch,
   wherein the controller automatically disengages the release clutch when the propulsion unit is not operating.

2. The vehicle of claim 1, wherein the release clutch is biased towards the disengaged position.

3. The vehicle of claim 1, wherein the propulsion unit comprises an oil system, and wherein the actuator comprises a hydraulic piston and cylinder that operate the release clutch, and wherein the controller comprises a fluid connection between the hydraulic cylinder and the oil system such that when the propulsion unit is running, oil pressure in the oil system controls the hydraulic piston and cylinder, which engages the release clutch.

4. The vehicle of claim 1, further comprising an alternator that electrically connects to the actuator.

5. The vehicle of claim 1, wherein the manual override switch allows the rider to selectively engage the release clutch when the propulsion unit is not operating.

6. The vehicle of claim 1, wherein the manual override switch allows the rider to selectively disengage the release clutch when the propulsion unit is operating.

7. The vehicle of claim 1, wherein the vehicle is one of a motorcycle, a scooter, a go-kart, an ATV, and a snowmobile.

8. The vehicle of claim 1, wherein the controller automatically engages the release clutch when the propulsion unit is operating.

9. The vehicle of claim 1, further comprising:
   an input shaft operatively connected to the continuously variable transmission; and
   a drive shaft operatively connected to the propelled device, wherein the release clutch operatively connects between the input shaft and the drive shaft.

10. The vehicle of claim 1, wherein the actuator comprises a hydraulic actuator.

11. The vehicle of claim 10, wherein the controller comprises an electronic control unit.

12. The vehicle of claim 1, further comprising a centrifugal clutch operatively disposed between the propulsion unit and the propelled device.

13. The vehicle of claim 12, wherein the centrifugal clutch is disposed between the propulsion unit and the continuously variable transmission.

14. A vehicle, comprising:
a propulsion unit;
a propelled device;
a continuously variably transmission operatively connecting the propulsion unit to the propelled device;
a release clutch disposed between the continuously variable transmission and the propelled device, the release clutch having an engaged position and a disengaged position, wherein the release clutch transfers power from the continuously variable transmission to the propelled device when in the engaged position, and wherein the release clutch does not transfer power from the continuously variable transmission to the propelled device when in the disengaged position, the release clutch comprising:
a shaft having a set of shaft teeth; and
a gear disposed on the shaft, the gear having a set of gear teeth, and
a non-centrifugally operated controller, the controller comprising an actuator operating the release clutch,
the actuator selectively displacing the gear along the shaft between
a first position where the gear rotates independently of the shaft such that the release clutch is in the disengaged position, and
a second position where the gear teeth engage the shaft teeth, causing the shaft to rotate with the gear such that the release clutch is in the engaged position, and
the controller automatically disengaging the release clutch when the propulsion unit is not operating.

15. The vehicle of claim 14, further comprising:
an input shaft operatively connected to the continuously variable transmission; and
a drive shaft operatively connected to the propelled device, wherein the release clutch operatively connects between the input shaft and the drive shaft.

16. The vehicle of claim 14, wherein the release clutch is biased towards the disengaged position.

17. The vehicle of claim 14, wherein:
the propulsion unit comprises an oil system,
the actuator comprises a hydraulic piston and cylinder that operate the release clutch, and
the controller comprises a fluid connection between the hydraulic cylinder and the oil system such that when the propulsion unit is running, oil pressure in the oil system controls the hydraulic piston and cylinder, which engages the release clutch.

18. The vehicle of claim 14, wherein the controller automatically engages the release clutch when the propulsion unit is operating.

19. The vehicle of claim 14, further comprising a centrifugal clutch operatively disposed between the propulsion unit and the propelled device.

20. The vehicle of claim 19, wherein the centrifugal clutch is disposed between the propulsion unit and the continuously variable transmission.

* * * * *